United States Patent [19]

Bodenbenner et al.

[11] 4,347,144
[45] Aug. 31, 1982

[54] PROCESS FOR THE PURIFICATION OF EFFLUENT

[75] Inventors: Kurt Bodenbenner, Wiesbaden; Helmut Perkow, Hofheim am Taunus; Helmut Vollmüller, Kelkheim, all of Fed. Rep. of Germany

[73] Assignee: Hoechst Aktiengesellschaft, Frankfurt am Main, Fed. Rep. of Germany

[21] Appl. No.: 318,860

[22] Filed: Nov. 6, 1981

[30] Foreign Application Priority Data

Nov. 8, 1980 [DE] Fed. Rep. of Germany ....... 3042193

[51] Int. Cl.³ .............................................. C02F 1/72
[52] U.S. Cl. ................................................... 210/761
[58] Field of Search .............. 210/758, 759, 760, 761, 210/762

[56] References Cited

U.S. PATENT DOCUMENTS

| 2,903,425 | 9/1959 | Zimmermann | 210/761 |
| 4,000,068 | 12/1976 | Nelson | 210/762 |
| 4,012,321 | 3/1977 | Koubek | 210/761 |
| 4,246,104 | 1/1981 | Schmidt | 210/759 |

FOREIGN PATENT DOCUMENTS 2034684 6/1980 United Kingdom ................ 210/761

Primary Examiner—Ernest G. Therkorn
Attorney, Agent, or Firm—Berman, Aisenberg & Platt

[57] ABSTRACT

Effluent containing organic impurities which are difficult to degrade is purified by oxidation in the aqueous phase at temperatures of 100° to 310° C. and under elevated pressure. This is effected by initially treating the effluent in a first stage with gases containing oxygen, but without the addition of catalysts, until the C.O.D. value has been reduced by 50 to 98%. The effluent which has received preliminary treatment in this way is subsequently treated, in a second stage, with an oxidizing agent stronger than oxygen, in the liquid phase and at the same, or at a higher, temperature, until the C.O.D. value has fallen to approximately 0 g/l.

5 Claims, 1 Drawing Figure

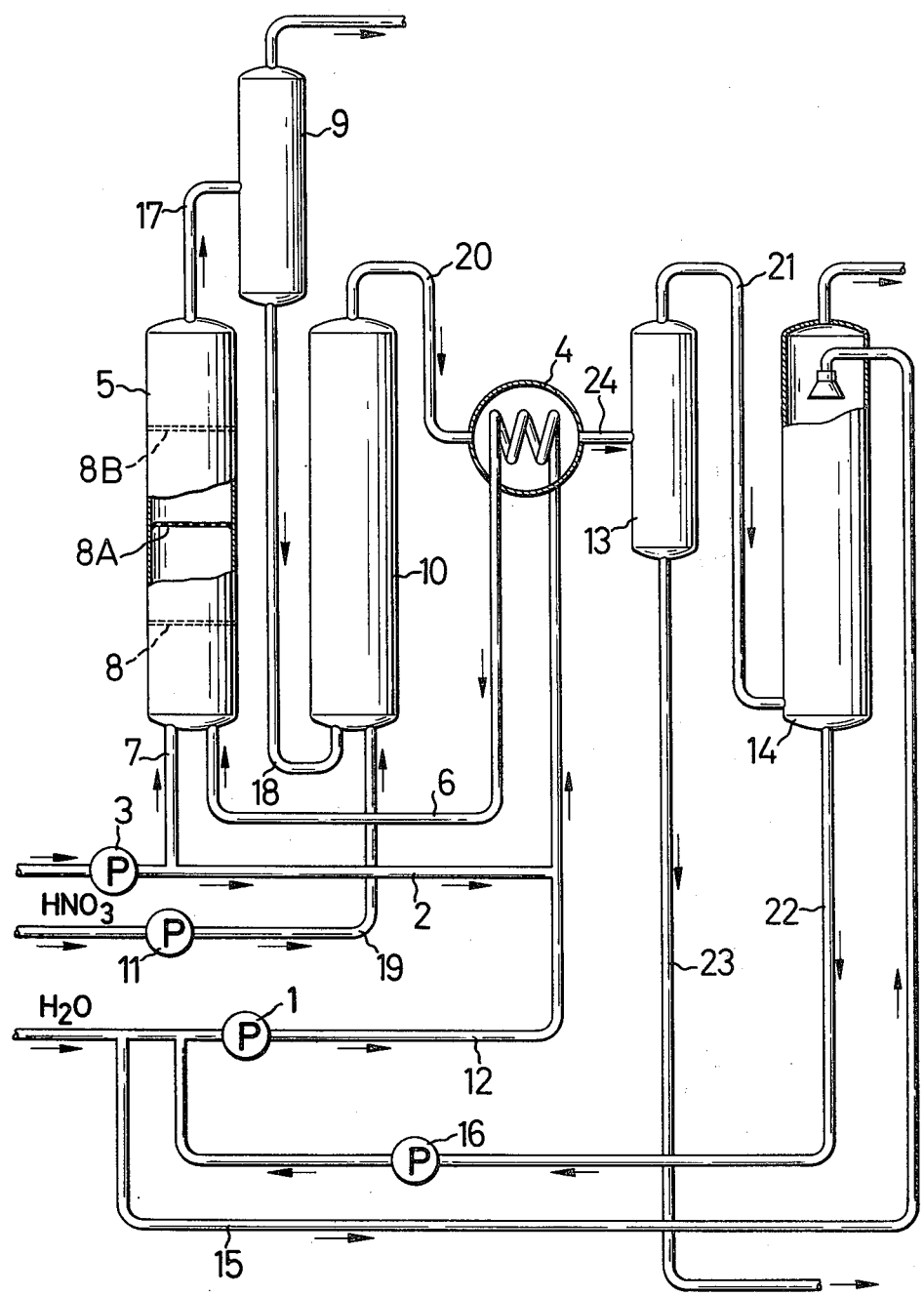

PROCESS FOR THE PURIFICATION OF EFFLUENT

The invention relates to a process for the purification of effluent containing organic impurities, by a two-stage oxidation.

It is known that water containing organic impurities can be purified by oxidation with gases containing oxygen at temperatures between 235° and 370° C. and under a pressure which is sufficient to keep at least a part of the water in the liquid phase. The "Zimmermann Process", as it is called, is described, for example, in U.S. Pat. Nos. 2,665,249 and 2,824,058.

Some effluents contain organic impurities which require temperatures around or above 320° C., and thus total pressures of up to 250 bars, for their complete degradation by wet oxidation with air. This makes the equipment large and expensive, particularly if it is intended to deal with chloride-containing effluents, which are extremely corrosive at high temperatures and therefore require expensive materials, such as ® Hastelloy, titanium or tantalum. In addition, as the total pressure increases, the cost of compressing the air employed becomes increasingly higher.

It is possible to improve the mass transfer of the oxygen into the aqueous phase, for example by installing stirrers in every stage of a cascade reactor (German Offenlegungsschrift No. 2,435,391). The increase in the reaction rate thus achieved makes it possible, in the case of some effluents, to reduce somewhat the reaction temperatures required. However, the process is expensive from a technical point of view, since an expensive, chambered reaction apparatus containing several shaft seals against high pressure is required.

It is also possible, by using a catalyst, to reduce the temperature required and thus the pressure for a constant degradation throughput. The corrosion problems and thus the equipment costs can be reduced considerably in this way (German Offenlegungsschrift No. 2,535,485). The catalysts customarily used are heavy metal compounds, in particular copper salts. However, owing to the fungicidal, algicidal and bactericidal action of the copper ions or the toxic action of other heavy metal ions, complete removal of the catalyst after the oxidation is absolutely necessary. Heterogeneous catalysts on a supporting material tend to become inactivated through contamination with substances contained in the effluent or become inactive as a result of catalyst poisons.

It is also known that wet oxidation with oxygen leads in many cases only to a partial degradation of the organic impurities (U.S. Pat. No. 3,977,966, Example 1; German Offenlegungsschrift No. 2,445,391). In these cases, it has been considered sufficient to subject the effluent thus pre-treated to biological treatment and then to put it into the main outfall (compare Chem.Ing. Technik 52 (1980) No. 8, page A440). However, it is a disadvantage in this procedure that some compounds are only very slowly degraded biologically and the quantity of them in the biological sewage treatment plant is therefore hardly reduced.

It is also possible to employ nitric acid or salts thereof for the oxidation (German Offenlegungsschrift No. 2,262,754). However, in this case it is necessary to employ at least the stoichiometric quantity of $HNO_3$ or a considerable excess, which—particularly at high C.O.D. values—makes the process uneconomical. It is indicated in German Offenlegungsschrift No. 2,748,638 that, if a less than stoichiometric quantity of $HNO_3$ is employed, the fractions of organic compounds which are destroyed are, in the main, only those which are biologically toxic and difficult to degrade. Thereby, it is alleged, effluents which are difficult to degrade by biological means are rendered accessible to purification in a biological sewage treatment plant. It is a disadvantage in this that the biological purification causes further expense. Furthermore, however, the C.O.D. value in the sewage treatment plant is only slightly reduced, insofar as it is due to impurities which are only slowly degraded by biological means, that is to say are not measured by the $BOD_5$ value.

The problem therefore existed of finding a process which manages without a biological sewage treatment plant, possesses the economy of the wet oxidation process using oxygen, but, nevertheless, makes it possible to purify the effluent virtually completely. A process has now been found for purifying effluent containing impurities which are difficult to degrade, by oxidation in an aqueous phase at temperatures of 100° to 310° C. under elevated pressure, the effluent being initially treated in a first stage with gases containing oxygen, but without the addition of catalysts, until the C.O.D. value has been reduced by 50 to 98%. The process comprises subjecting the effluent which has received preliminary purification in the first stage, subsequently, in a second stage, to treatment with an oxidizing agent stronger than oxygen, in the liquid phase and at the same, or at a higher, temperature, until the C.O.D. value has fallen to about 0 g of $O_2$ per l. The C.O.D. value of the effluent is determined using dichromate in the presence of silver salts. This method is described in detail in "Deutsche Einheitsverfahren für Wasser-, Abwasser- und Schlammuntersuchung" (German Standard Processes for the Examination of Water, Effluents and Sludge), 3rd edition, 1971.

Oxidizing agents which are ranked as stronger than oxygen are substances which, in a 1-molar solution, or under a pressure of 0.98 bar, in water at the pH value of the solution to be purified, have a higher redox potential than $O_2$, such as, for example, ozone or chlorate. Oxidizing agents which are preferred in the second stage are nitric acid or nitrates. In this case, pH values of 1 to 3 in the oxidation are preferred; however, oxidation can also be carried out, even if more slowly, at higher pH values. The quantity of nitric acid or nitrate is about 0.02 to 0.05 mole/g of C.O.D, in particular 0.025 to 0.03 mole/g of C.O.D.

Under the reaction conditions, nitric acid and nitrates exhibit hardly any tendency to form oxides of nitrogen, but are reduced almost completely to give nitrogen.

Since no endeavour is made, in the process according to the invention, to degrade organic impurities completely in the first stage, it is possible to operate this stage at temperatures which are 10° to 80° C., preferably 40° to 60° C., lower than the temperatures required for complete degradation. The "temperature required for complete degradation" is understood in this context to mean the temperature at which the C.O.D. value of an effluent is decreased by 95 to 100%, if the reaction is carried out in a stirred autoclave, with a residence time of 30 minutes and with a 10 to 20% excess of oxygen. In the process according to the invention, the effluent does not have to be heated to such a high temperature, the equipment can be designed for lower pressures and the corrosive attack, in particular by chloride ions, which frequently occur in effluents, is reduced.

In the first stage, the total pressure should be 1.0 to 3.5 times, in particular 1.5 to 2.5 times, the partial pressure of water vapor at the operating temperature.

The effluent leaving the first stage is fed to the second stage without cooling. In the second stage an increase in temperature can take place, caused by a newly commencing degradation of the organic compounds when the oxidizing agent is added. In general, therefore, the second stage also takes place at temperatures of 100° to 310° C. Temperatures of 200° to 300° C. are preferred in both stages. The process can be carried out at lower temperatures, in particular when there is a high content of very readily oxidizable organic substances, such as, for example, formaldehyde. If, as well as readily degradable substances, organic impurities which are difficult to degrade are also present in the effluent, account can be taken of this in the second stage by selecting the temperature and the residence time accordingly.

The process according to the invention is particularly suitable for effluents having a C.O.D. of at least 10 g/l, in particular at least 20 g of C.O.D./l. Effluents which are free from heavy metal ions are preferred, since a further treatment stage is then no longer required after the oxidation. The process according to the invention is suitable for purifying many types of effluent, in particular for effluents originating from the manufacture of secondary products of cellulose. It is thus possible, in most cases, to purify the effluent employed to such an extent that the C.O.D. value has fallen to less than 2% of its original value and a further (for example biological) after-treatment is superfluous.

One possible means of putting into practice, on an industrial scale, the process according to the invention is illustrated by means of the flow-sheet of the FIGURE:

Effluent containing organic impurities is compressed by means of a high pressure pump (1) to the operating pressure of the reactor 5 and is warmed, via line 12, in a counter-current heat exchanger 4, together with a partial stream, fed via (2), of the air compressed in compressor 3. The pre-heated effluent is then fed to a cascade reactor 5 having sieve trays (8, 8A and 8B), from below through the feed line 6. At the same time, the remainder of the air compressed by pump 3 is fed into the reactor through the feed line 7. The reaction mixture is fed to a separator 9 via the line 17. In this separator the inert constituents of the air and the reaction gases are separated from the liquid phase. The effluent, which is partially freed from its organic constituents is now fed to a second reactor 10 via (18). (In principle, reactor 5 could also be connected to reactor 10, for example could be placed on top of the latter. The gas phase formed in 5 would then only be separated from the liquid phase together with the gas phase from 10—this is not drawn).

Nitric acid is then added in the reactor 10, via a pump 11 and line 19, in a quantity (calculated as C.O.D; 40 g of C.O.D. correspond to 1 mole of $HNO_3$) which is stoichiometric in relation to the residual organic constituents. Disregarding an increase in temperature caused by the oxidation with nitric acid, reactor 10 is operated at the same temperature as the reactor 5. The pressure in 10 is lower than the pressure in 5, by the partial pressure of air discharged at the head of 9.

Reactor 10 is preferably constructed, like reactor 5, as a bubble column having sieve trays arranged in cascade. Another type of reactor, such as, for example, a stirred vessel or a flooded packed column, is also possible, however. Any materials which are customary in the wet oxidation process with air are suitable as materials of construction; for example titanium alloyed with palladium can be employed for an effluent containing chloride.

The purified effluent is then fed, together with the reaction gases, via line 20 to a heat exchanger 4 and is there cooled in counter-current with the fresh effluent. Excess heat can be utilized for the production of steam in a vaporizer (not drawn). From 4 the mixture passes via line 24 to the separator 13. The reaction gases and the effluent are separated here. The reaction gases, which can be contaminated with $NO_x$, for example when starting up the apparatus, are taken off at the head of 13 and pass via 21 to the washer 14. Here they are purified in a part stream of the fresh effluent which is fed in via 15. The loaded stream of wash water leaves 14 at its base and is recycled to the effluent to be purified via line 22, in which pump 16 is inserted. Emission of $NO_x$ is thus prevented with certainty and the nitric acid is utilized entirely for the oxidation. Purified effluent is withdrawn via line 23 at the base of 13. The invention is illustrated in greater detail by means of the following examples.

EXAMPLE 1

The effluent from manufacture of secondary products of cellulose has a C.O.D. value of 40 g/l. Using wet oxidation in a shaking autoclave and a quantity of air 50% greater than the stoichiometrical requirement, a temperature of 330° C. and a pressure of 220 bars are required, at a residence time of 1 hour, for 95% reduction in C.O.D.

Using wet oxidation alone, with nitric acid as the oxidizing agent, complete reduction of C.O.D. is achieved at 250° C. However, 90 kg of 65% strength $HNO_3$ are required per $m^3$ of effluent.

If the same effluent is subjected to the process according to the invention, the C.O.D. value can initially be reduced by 75% to 10 g/l in the first stage by wet aerial oxidation at 280° C. and 110 bars. For complete oxidation in the second stage it is only necessary to add 22 kg of 65% strength $HNO_3$ per $m^3$ of effluent. Here too, the residence time in the first stage is one hour.

EXAMPLE 2

Another effluent, which also originates from the manufacture of secondary products of cellulose (C.O.D. value 25 g/l), is extremely corrosive at the temperature of 310° C. (and a pressure of 170 bars) which is required for degradation by wet oxidation, because it contains 8% by weight of sodium chloride. If the 2-stage process according to the invention is used, a C.O.D. of 5 g/l (80% reduction) is achieved by wet aerial oxidation at a temperature as low as 270° C. and a pressure as low as 93 bars (residence time 1 hour). The second stage, similarly at 270° C., requires 11 kg of 65% strength $HNO_3$ as the oxidizing agent per $m^3$ of effluent. As a result of reducing the reaction temperature by 40° C., the corrosive attack of the effluent is reduced, so that the oxidation can be carried out without problems in titanium equipment (preferably alloyed with palladium).

We claim:

1. A process for the purification of effluent containing organic impurities which are difficult to degrade, by oxidation in an aqueous phase at temperatures of 100° to 310° C. and under elevated pressure, the effluent being initially treated in a first stage with gases containing oxygen, but without addition of catalysts, until the C.O.D. value has been reduced by 50 to 98%, which comprises subjecting the effluent which has received preliminary treatment in this way, subsequently, in a second stage, to treatment with an oxidizing agent stronger than oxygen, in the liquid phase and at the same, or at a higher, temperature, until the C.O.D. value has fallen to approximately 0 g/l.

2. A process as claimed in claim 1, wherein nitric acid or a nitrate are used as the oxidizing agent in the second stage.

3. A process as claimed in claim 2, wherein 0.02 to 0.05 mole of nitric acid or nitrates per g of C.O.D. in the effluent leaving the first stage, are employed for oxidation in the second stage.

4. A process as claimed in claim 1, wherein the effluent containing the organic impurities which are difficult to degrade, originates from the manufacture of secondary products of cellulose.

5. A process as claimed in claim 1, wherein the effluent employed also contains chlorides in addition to the organic impurities.

* * * * *